S. RESEK.
STOP AND WASTE COCK.
APPLICATION FILED APR. 5, 1917.
1,294,166. Patented Feb. 11, 1919.
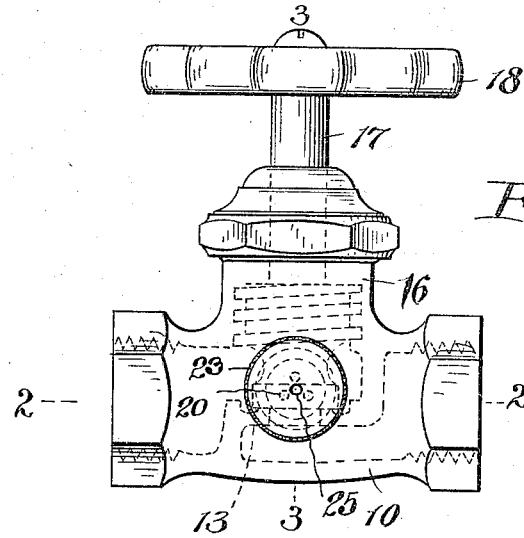
Fig. 1.
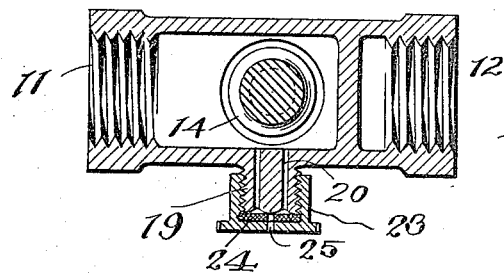
Fig. 2.
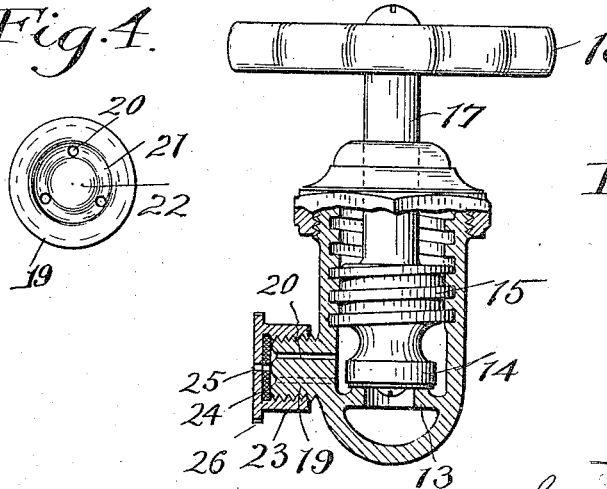
Fig. 4.
Fig. 3.
Inventor:
Simon Resek
By Thurston & Kwis
attys.

UNITED STATES PATENT OFFICE.

SIMON RESEK, OF CLEVELAND, OHIO.

STOP AND WASTE COCK.

1,294,166.　　　Specification of Letters Patent.　　Patented Feb. 11, 1919.

Application filed April 5, 1917. Serial No. 159,870.

*To all whom it may concern:*

Be it known that I, SIMON RESEK, a citizen of the United States, residing at Cleveland, in the county of Cuyahoga and State of Ohio, have invented a certain new and useful Improvement in Stop and Waste Cocks, of which the following is a full, clear, and exact description.

This invention relates to a stop and waste cock and has for its chief object the provision of a cock of this character having provision for a more effective drainage of water than with the cocks in use at the present time.

With most stop and waste cocks now in use, a complete drainage of water in the line above the cock after the closure thereof cannot be obtained unless air is admitted in the pipe at some point above the cock, this being due to the fact that there is no suitable air vent in the cock other than that provided by the drainage opening through which the water escapes, but generally the air cannot be admitted through this opening to permit a free drainage of the water, with the result that the back pressure of air on the water in the drainage opening prevents the complete drainage from the pipe above the cock.

The above mentioned disadvantage or objectionable feature is overcome very effectively by my invention which may be briefly summarized as consisting in certain novel details of construction and combinations and arrangements of parts which will be described in the specification and set forth in the appended claims.

In the accompanying sheet of drawings showing an embodiment of my invention which operates with high efficiency, Figure 1 is a side view of a stop and waste cock containing my invention; Fig. 2 is a section substantially along the line 2—2 of Fig. 1; Fig. 3 is a section substantially along the line 3—3 of Fig. 1; and Fig. 4 is a view on a slightly enlarged scale looking toward the end of the drainage boss which is cast onto the body or casing of the cock.

The stop and waste cock includes a body portion 10 having threaded end portions 11 and 12 to which pipes may be connected in the customary manner. The valve is provided also with the usual valve seat 13 and with a valve 14 carried by a threaded body 15 which has a threaded engagement with the neck 16 forming a part of the body 10, the threaded member 15 having a stem 17 which may be turned by a hand-wheel or equivalent member 18 to raise and lower the valve, that is to say, to open and close the cock. The details of the parts so far described are immaterial to my invention as any other suitable type of valve and means for operating it may be employed, the present construction being illustrative of one of the numerous constructions in which my invention may be embodied.

The waste or drainage feature in which my invention resides particularly, includes a boss 19 which is cast integral with and extends outwardly from the body 10 of the cock, the specific location of this boss being immaterial as long as it is so located that water may drain from the pipe or pipes above the cock when the cock is closed. In this case the boss is located substantially centrally between the ends of the body 10. This boss is threaded externally and it is provided with a plurality of drainage or combined drainage and vent openings 20 which extend axially through the boss and are eccentrically disposed with respect to the center of the boss. It is preferable that there be at least two of these openings, but there may be more than two, three openings being shown in this case. These openings are drilled axially through the boss from the outer end through the wall of the chamber, and preferably at the outer face of the boss the latter is provided with a circular groove 21 (see Fig. 4) from which the drainage and vent openings 20 extend inwardly through the boss. This construction leaves a centrally disposed rounded imperforate portion 22 at the outer end of the boss.

An internally threaded cap 23 is screwed onto the boss and is designed to be turned to open and close communication through the drainage and vent openings 20. In the base of this cap there is a yieldable seat or gasket 24 which is adapted to be pressed against the outer end of the boss 19. The end of the cap and the yieldable seat 24 are provided with registering centrally disposed openings 25 which are directly opposite the central imperforate rounded portion 22 at the outer end of the boss and are effectively closed by the latter when the cap is screwed tight on the boss or is in its final position, but when the cap is backed away slightly (only a fraction of a turn will be necessary for this purpose) the passageways 20 are opened for the escape of water from the cock and for the admission of air to the cock. The water escapes through one or all of the openings 20, and passes out through the openings 25 in the seat 24 and in the head or end of the cap. This construction admits of the complete drainage of water from the pipe or pipes above the cock, for the plurality of openings through the boss admit of the simultaneous outward flow of water and inward passage of air. This is true even though a full stream of water may be flowing through the openings 25 in the cap and seat 24, because when the cap is loosened to permit drainage, air can pass between the threaded portions of the cap and plug, and pass through one of the openings 20 in the boss to the chamber of the body 10 while water is passing out through one or more of the other drainage openings 20. Preferably the head or end of the cap is provided with a knurled peripheral portion 26 which is grasped by the operator when he wishes to tighten or loosen the cap, and if desired, any suitable means may be provided to limit or confine the movement of the cap to that which is necessary to open and close the drainage openings. I may employ for this purpose a pin and slot connection between the boss and cap such as may be obtained by cutting an arc shaped slot in the cylindrical body of the cap and by inserting a stop pin through the slot into the side of the boss after the cap is in place, or any other stop or movement limiting means may be employed.

In addition to the advantages above stated, my improved stop and waste cock is simple in construction and is not expensive to manufacture as far as the drainage feature is concerned. Additionally when waste water is discharged from the cock it passes out through the middle of the cap in a very desirable manner and in such a way that the stream of water is not thrown about as the cap is turned, as would be the case if the discharge opening of the cap were eccentrically located, or if it were located in the side of the cap rather than centrally in the end thereof.

Having thus described my invention, what I claim, is:

1. A stop and waste cock including a body to which pipe connections may be made, said cock having a valve seat and a valve adapted to be opened and closed, a boss extending outwardly from the body and a cap surrounding said boss and movably seated thereon, the boss having an imperforate central portion and having a plurality of eccentrically disposed drainage openings extending through the boss from its outer end to the chamber in the body of the cock, and the cap having a central drainage opening opposite said central imperforate portion of the boss and adapted to be closed by the latter.

2. A stop and waste cock including a body to which pipe connections may be made, said body having a valve seat and a valve adapted to be opened and closed, a boss extending outwardly from the body, and a cap surrounding the boss and movably seated thereon, the boss having eccentrically disposed drainage openings extending therethrough and provided at its outer end with a groove connecting said openings, and the cap having a centrally disposed drainage opening coöperating with the portion of the boss within the groove.

3. A stop and waste cock including a body to which pipe connections may be made, said body having a valve seat and a valve adapted to be opened and closed, an externally threaded boss extending outwardly from the body, and an internally threaded cap screwed onto the plug, the boss having eccentrically disposed drainage openings, and the cap having a centrally disposed drainage opening, and means other than the central drainage opening of the cap whereby air may be admitted to one or more openings of the plug while drainage is taking place.

In testimony whereof, I hereunto affix my signature.

SIMON RESEK.

Copies of this patent may be obtained for five cents each, by addressing the "Commissioner of Patents, Washington, D. C."